(12) United States Patent
Curry et al.

(10) Patent No.: US 7,302,116 B2
(45) Date of Patent: Nov. 27, 2007

(54) METHOD AND APPARATUS FOR REDUCED SIZE IMAGE

(75) Inventors: Donald J. Curry, San Mateo, CA (US); Asghar Nafarieh, Menlo Park, CA (US); Doron Kletter, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 752 days.

(21) Appl. No.: 10/776,620

(22) Filed: Feb. 12, 2004

(65) Prior Publication Data

US 2005/0180658 A1     Aug. 18, 2005

(51) Int. Cl.
*G06K 9/32* (2006.01)
(52) U.S. Cl. ..................................... 382/300
(58) Field of Classification Search ........ 382/293–300, 382/176, 309
See application file for complete search history.

(56) References Cited

U.S. PATENT DOCUMENTS

| | | | |
|---|---|---|---|
| 4,610,026 A * | 9/1986 | Tabata et al. ............... | 382/300 |
| 4,725,892 A * | 2/1988 | Suzuki et al. ............... | 382/299 |
| 4,849,914 A | 7/1989 | Medioni et al. | |
| 4,872,064 A * | 10/1989 | Tutt et al. ................... | 382/298 |
| 5,515,452 A | 5/1996 | Penkethman et al. | |
| 5,583,659 A | 12/1996 | Lee et al. | |
| 5,745,596 A | 4/1998 | Jefferson | |
| 5,900,953 A | 5/1999 | Bottou et al. | |
| 6,058,214 A | 5/2000 | Bottou et al. | |
| 6,324,305 B1 | 11/2001 | Holladay et al. | |
| 6,343,154 B1 | 1/2002 | Bottou et al. | |
| 6,400,844 B1 | 6/2002 | Fan et al. | |
| 6,633,670 B1 | 10/2003 | Matthews | |
| 2004/0146199 A1 * | 7/2004 | Berkner et al. ............. | 382/176 |
| 2005/0063615 A1 * | 3/2005 | Siegel et al. ................ | 382/309 |

FOREIGN PATENT DOCUMENTS

| | | |
|---|---|---|
| EP | 0 712 094 A2 | 5/1996 |
| EP | 1 006 716 A2 | 6/2000 |

OTHER PUBLICATIONS

R. De Queiroz, "Compression of Compound Documents," *IEEE*, Oct. 1999, pp. 209-213.
U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.

(Continued)

*Primary Examiner*—Jingge Wu
*Assistant Examiner*—Jayesh A Patel
(74) *Attorney, Agent, or Firm*—Oliff & Berridge, PLC

(57) ABSTRACT

Reduced size images may be generated by separating dimensions that span the original image into a plurality of groups so that data in each group of one or more dimensions may be processed differently from data of other groups. For example, for two-dimensional images, pixels of selected lines may be completely discarded or skipped while pixels of remaining lines may be processed along the x-dimension to obtain data of the reduced size image. The main advantages include very fast and efficient implementation, minimal storage requirements, and good image quality.

12 Claims, 7 Drawing Sheets

OTHER PUBLICATIONS

U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,612, filed Feb. 12, 2004, Curry et al.
U.S. Appl. No. 10/776,603, filed Feb. 12, 2004, Curry et al.
U.S. Appl. No. 10/776,509, filed Feb. 12, 2004, Curry et al.
U.S. Appl. No. 10/776,508, filed Feb. 12, 2004, Curry et al.
U.S. Appl. No. 10/776,516, filed Feb. 12, 2004, Curry et al.

* cited by examiner

METHOD AND APPARATUS FOR REDUCED SIZE IMAGE

BACKGROUND OF THE INVENTION

1. Field of Invention

This invention is directed to reduced size image.

2. Description of Related Art

Reduced size images such as thumbnails are commonly used for conveniently viewing images without expending resources for supporting display of all the image data. Further improvements in generating reduced size images are needed.

SUMMARY OF THE INVENTION

Reduced size images may be generated by combining image data along dimensions that span an original image. For example, in two-dimensional images, picture elements (pixels) may be combined via an interpolation process to generate output pixels along each of x- and y-dimensions. While such processes may generate acceptable reduced size images (thumbnails), processing time required to generate such thumbnails may be higher than desired.

To reduce the time required to generate reduced size images, dimensions that span the original image may be separated into a plurality of groups so that data in each group of one or more dimensions may be processed differently from data of other groups. For example, two-dimensional images may be spanned in the y- and x-dimensions so that picture elements (pixels) are arranged in rows and columns (lines of pixels and pixels along the lines), respectively. In this case, pixels of selected lines may be completely discarded or skipped while pixels of remaining lines may be processed along the x-dimension to obtain data of the reduced size image or thumbnail.

The data may be processed via interpolation by multiplying a number of consecutive pixels by a corresponding weight, summing the results of the multiplication and dividing the sum by a normalizing factor. Further speed improvement may be obtained by setting all the weights to unity (1) and summing over a power of 2 number of pixels. Limiting the number of pixels summed to a power of 2 simplifies the division to a binary shift. In this way, reduced size images may be generated with greater efficiency and speed while controlling the quality of the reduced size image.

BRIEF DESCRIPTION OF THE DRAWINGS

Exemplary embodiments are described below with reference to the following figures, wherein.

DETAILED DESCRIPTION

Figure 1:
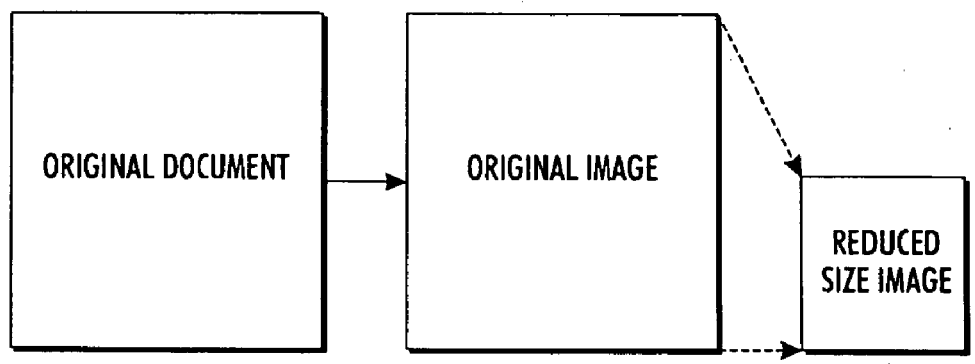
FIG. 1 shows an original document reduced down to a reduced size image.

FIG. 1 shows an original document converted to an original image reduced to a reduced size image. While FIG. 1 shows the original document, original image and the reduced size image as having two-dimensions, any number of dimensions may be included. For ease of discussion, the following discussion will use a two-dimensional example for clarity and familiarity, and the reduced size image may sometimes be referred to as a thumbnail or thumbnail image.

Figure 2:
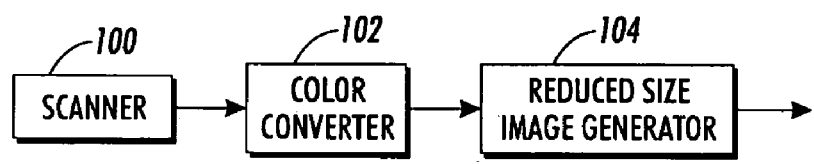
FIG. 2 shows an exemplary system diagram in which a reduced size image generator may operate.

FIG. 2 shows an exemplary process where original documents are scanned by a scanner 100 generating original image data such as data in an RGB color space, for example. This color space may be converted to a YCC color space by a color converter 102. As is well known, the YCC color space includes a luminance component (Y) and two chromatic components (CC). The chromatic components may be subsampled at a 2:1 ratio, at least in one direction if not in both, so that there are half as many data points in the chromatic components as there are in the luminance components. The original image in the YCC color space may be input by a reduced size image generator 104 to generate a reduced size image. Other color spaces such as Lab, for example, may be used.

Figure 3:
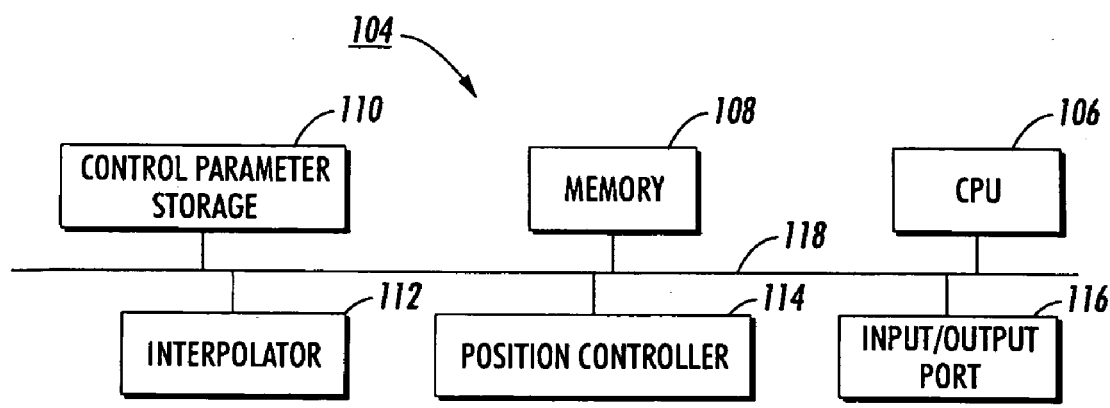
FIG. 3 shows an exemplary system diagram of the reduced size image generator shown in FIG. 2.

FIG. 3 shows an exemplary block diagram of the reduced size image generator 104. The reduced size image generator 104 may include a CPU 106, a memory 108, a control parameter storage 110, an interpolator 112, a position controller 114 and an input/output port 116. The above components 106-116 may be coupled together via a bus 118. While the reduced size image generator 104 is illustrated using a bus architecture diagram, any other type of hardware configuration may be used such as using application specific integrated circuits (ASICs) to implement one or more of the components, or writing a computer program that executes in the CPU 106 to perform all the functions of the reduced size image generator, etc.

The reduced size image controller 104 receives data of the original image and control parameters via the input/output port 116. The image data may be stored in the memory 108 and the control parameters may be stored in the control parameter storage 110. If the control parameter storage 110 is a non-volatile memory, the control parameters may be pre-stored in the control parameter storage 110 instead of being received via the input/output port 116. The original image data includes pixel values that are generated by the scanner 100. These pixels have predetermined positions relative to the original document. These positions may be determined relative to a reference point of the original document. For example, for a two-dimensional original document (e.g., an 8.5×11 sheet of paper), a predetermined reference point may be set to be the top left corner of the sheet of paper. All the pixels in the original image may be assigned a position relative to this predetermined reference point.

Figure 4:
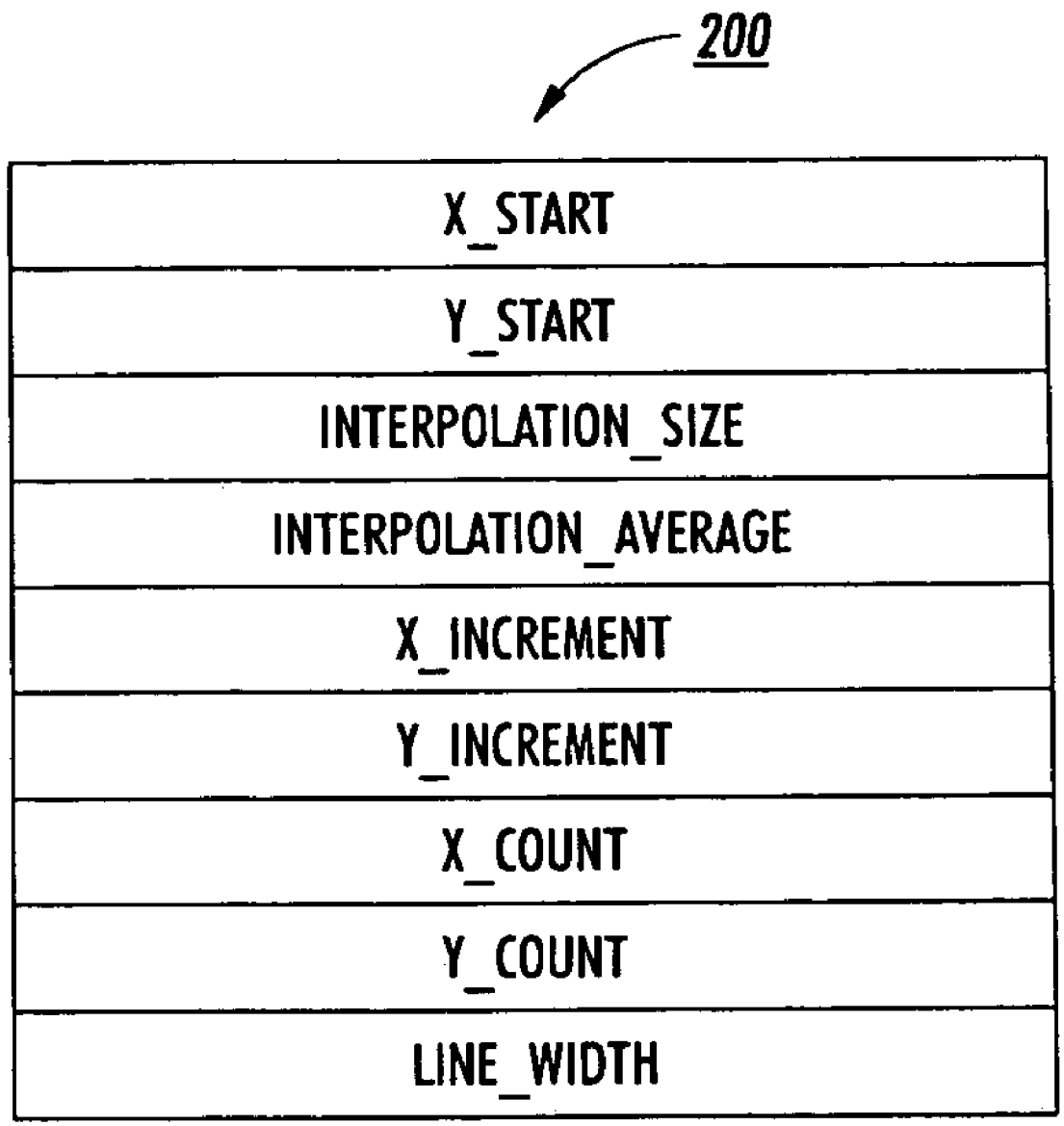
FIG. 4 shows a table of exemplary parameters for controlling the reduced size image generator.

FIG. 4 shows a table 200 of exemplary control parameters for two-dimensional original images that may be used to control the reduced size image generator 104. X_start and y_start parameters specify a starting position in the original document. For example, the color converter 102 may have replicated pixels along a perimeter of the original image for types of processing that require a context. Thus, x_start and y_start parameters identify a position in the original document corresponding to a pixel in the original image (for example, a top left pixel in two-dimensions) that the reduced size image generator 104 may start generating a reduced size image.

The x_start and y_start parameters may also be used to control an amount of the original image that may be used to generate a reduced size image. For example, placing the x_start and y_start at an interior point of the original document may effectively crop out portions of the original image that are not desired to be in the reduced size image. If the original image is a printed document having a header and a footer, for example, the x_start and y_start parameters may be used to identify a position that is below the header so that the header is not included in the reduced size image.

The interpolation_size_and interpolation_average parameters may be used to determine a number of pixels from an original image that are used to generate one pixel of the reduced size image. The interpolation_size parameter specifies the number of consecutive pixels in the original image used to generate a single pixel in the reduced size image. (For original images of more than two-dimensions, the interpolation_size parameter may be a tuple of numbers specifying consecutive numbers of pixels in each dimension.) The interpolation_average parameter may be used as a normalization factor in the interpolation process.

For example, if the interpolation_size parameter is 4, then 4 pixels along a line of the original image may be used to generate a single pixel in the reduced size image. Each of the pixels in the original image may be multiplied by a corresponding weight, the multiplication results summed and the sum divided by the interpolation_average. For a particularly efficient implementation, the interpolation_size parameter may be limited to a power of 2 and/or all interpolation weights set to unity (1). Under these conditions, the interpolation_average should be set to be a number of right shifts corresponding to the power of 2 specified by the interpolation_size. Thus, if the interpolation_size is equal to 4, then the interpolation_average is equal to 2. For this example, 4 pixels in the original image is summed and then the sum is right shifted by 2 to obtain a single pixel in the reduced size image.

The x_increment and y_increment parameters may be used to determine a position within the original document from which a next set of pixels in the original image may be selected to generate a next pixel of the reduced size image. For example, if pixels in the original image were generated by the scanner 100 having fast and slow scan directions, pixels in the fast scan direction (e.g., left to right in the x-dimension) for each line (y-dimension) may be selected for interpolation. When the end of a current line is reached, a next line in the slow scan direction may be selected. Thus, if interpolation_size=4 and the x-position and the y-position indicate a current position of a current line that corresponds to a current pixel, then the current pixel and three consecutive pixels following the current pixel may be selected for interpolation to generate a next pixel of the reduced size image, the x_position is incremented by x_increment to obtain a position of a next set of 4 pixels in the current line to generate a next pixel of the reduced size image. When the end of the current line is reached, the y_position is incremented by y_increment for a position in the y_dimension of a new current line, and the x_position is reset to x_start to obtain a position of a next set of 4 pixels. This process continues until all the pixels of the reduced size image are generated. The relationship between x_ and y_positions and a corresponding pixel is explained in connection with FIG. 5 below.

X_count and y_count parameters identify which pixels in the reduced size image is being output by the reduced size image generator 104. For example, as the reduced size image generator 104 processes pixels in the original image along the x-dimension, the x_count is incremented by 1 for each pixel generated in the reduced size image. When the end of the current line in the original image is reached and x_position is set to x_start, x_count may be reset to a predetermined value such as 0 and y_count incremented by 1.

A line_width parameter specifies a number of pixels in a line (the x dimension) that could be used to generate the reduced size image. Thus, similar to the x_start and y_start parameters, the line_width parameter may be used to crop out portions of the original image so that they are not used to generate the reduced size image or simply indicate the number of pixels in a line. For the remainder discussion, x_position, x_position parameter or x_position value may be used interchangeably to indicate the position in the x-dimension. Similar usage is made for all other parameters.

Figure 5:
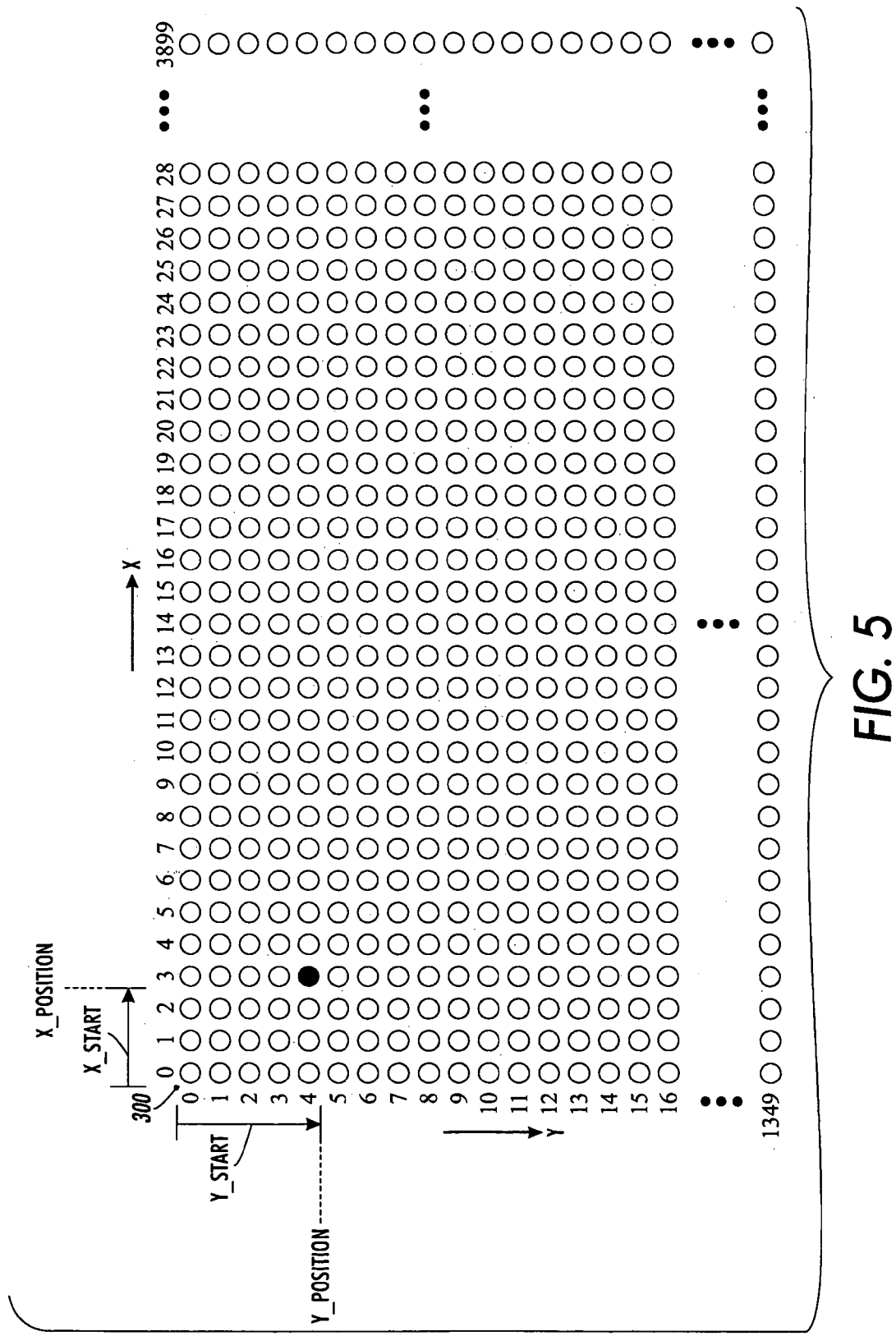
FIG. 5 shows an exemplary two-dimensional pixel diagram for information printed on one document sheet.

FIG. 5 shows a pixel diagram for an original image having 3900 pixel positions in the x-dimension and 1350 pixel positions in the y-dimension. As indicated in the top and left numeral sequences, the pixel positions in the x- and y-dimensions are numbered starting with 0 from left to right and top to bottom.

The x_start and the y_start parameters are referenced from a predetermined reference point in an original document. This predetermined reference point may be a position of a top-left-most point. This position may correspond to a top-left-most pixel in the original image, but does not necessarily have to correspond to any pixel position (which may be an integer, for example) on the original scanner grid. Also, the x_start and y_start parameters may have a value that is not an integer multiple of a pixel separation distance between adjacent pixels. As shown in FIG. 5, the predetermined reference point 300 is not at the top-left-most pixel position and the magnitudes of the x_start and y_start parameters are not integer multiples of pixel separation distances in the x- and y-dimensions. Similarly, the x_increment and y_increment may have a value that is not an integer multiple of the pixel separations in the x- and y-dimensions.

Because the x_start, y_start, x_increment and y_increment parameters may have values that are not integer multiples of the pixel separation distances in the x- and y-dimensions, the x_position and y_position parameters may be used to keep track of an exact current position within the original document and x_pixel and y_pixel parameters may be used to identify a current pixel within the original image. The x_pixel is the pixel number (column number) when counting from left to right where x_pixel=0 identify the left most pixel in a line. Y_pixel identifies the current line where y_pixel=0 identifies the top line in the original image. The x_pixel parameter is set to the x position parameter rounded to the nearest integer position. When the x_position is exactly between two pixel positions, its value is rounded downwards to obtain the x_pixel value. FIG. 5 shows that the x_position is closest to pixel 3. Thus, x_pixel value is set to 3. Similarly, y_pixel value is set to the y_position value rounded to the nearest integer and identifies the current line.

FIG. 5 shows that the y_position value is closest to line 4. Thus, y_pixel value is set to 4. Accordingly, for the example shown in FIG. 5, the pixel at (x=3,y=4) is the first of 4 pixels (if interpolation_size=4) used to generate a first pixel in the reduced size image. Thus, the x_position and interpolation-_size defines a neighborhood in which pixels are selected for generating a pixel in the reduced size image. The boundaries of the neighborhood are defined as discussed above.

Returning to FIG. 3, the position controller 114 identifies data points (e.g., pixels) of an original image to be used to generate a reduced size image such as a thumbnail image. The interpolator 112 generates output data points (e.g., pixels) of the reduced size image based on the data points identified by the position controller 114. When starting a reduced size image generation process, the CPU 106 may instruct the position controller 114 to retrieve needed parameters from the control parameter storage 110 and to maintain the x_position, y_position, x_pixel and y_pixel values. The x_pixel and y_pixel values are used to retrieve appropriate pixel values of the original image from the memory 108 and, upon instruction from the CPU 106, the retrieved pixel values are provided to the interpolator 112 which begins generation of the interpolated values for the reduced size image. While the above describes that the original image is stored in the memory 108, the reduced sized image may be generated on the fly directly from the output of the scanner 100 (if no color conversion is needed) or from the output of the color converter 102. In this case, the original image need not be stored in the memory 108, but only intermediate values need to be temporarily stored. Memory may be needed to hold the interpolation sum such as registers in the CPU 106, for example.

After each pixel of the reduced size image is generated by the interpolator 112, the position controller 114 increments the x_position by x_increment and updates the x_pixel value. The position controller 114 then retrieves appropriate pixels of the original image from the memory 108 and provides them to the interpolator 112 for generating a next pixel value of the reduced size image. This process continues until all the pixels corresponding to the current line identified by the y_pixel value is exhausted, or until a predefined number of reduced size image pixels in the x-dimension is reached whichever comes first. The predefined number may be an additional control parameter x_count_limit added to the list shown in FIG. 4. For similar reasons, a corresponding control parameter y_count_limit may also be added for the y-dimension. At this point, the position controller 114 increments y_position by the value of y_increment and determines a y_pixel value identifying a next line of pixels of the original image that may be used to generate the next line of the reduced size image. Thus, the pixels in the x-dimension of a current line are interpolated while the pixels in the y-dimension that are skipped and are discarded to generate the reduced size image.

The x_count_limit and y_count_limit may be used for effectively cropping the original image on the right hand and bottom sides, respectively, when the the right or bottom margins are not to be included with the reduced size image, for example. It should be appreciated that the reduction ratio from the original image size to the reduced image size may be large, and therefore the information available in so many lines of the original image may far exceed the capability to display such information within the reduced size image, and in particular when the purpose for generating a thumbnail is merely for ease of documents identification by structure or shape.

Figure 6:
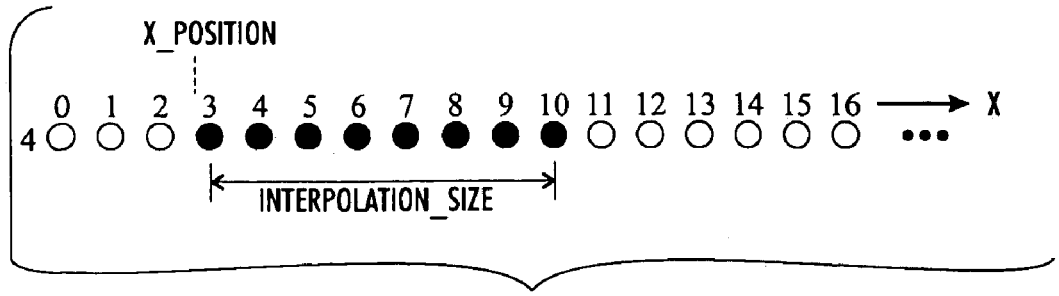
FIG. 6 shows line 4 of the pixel diagram of FIG. 5 and exemplary pixels selected to generate a first pixel of a reduced size image.

FIG. 6 shows an example where line 4 of the original image and pixels 3-10 (interpolation_size equal 8) are selected for interpolating a first pixel (x_count equals 0 and y_count equal to 0) of the reduced size image. The position controller 114 retrieves pixels 3-10 of line 4 of the original image from the memory 108 and the interpolator 112 generates a corresponding pixel in the reduced size image by multiplying each of the pixels 3-10 by a corresponding weight value, summing the results of the multiplications and dividing the summed result by a value corresponding to the interpolation_average value. Depending on the quality of the reduced size image that is desired and the desired speed of the interpolation process, all the weights may be set equal to a value of 1 so that the interpolator 112 merely sums the pixel values for the pixels 3-10 without any multiplication. Since the interpolation_size is a power of two ($2^3$) in this particular example, the division by the value corresponding to the interpolation_average may be easily obtained by simply right shifting the sum by 3 bits, for example if the LSB is on the right. If the interpolation_size is constrained to only be a power of 2, the interpolation_average value may be a value that is equal to the number of right shifts to achieve the division process, for example. In this way, the speed of the interpolation process may be increased which in turn reduces the amount of time required to generate the reduced size image.

Figure 7:
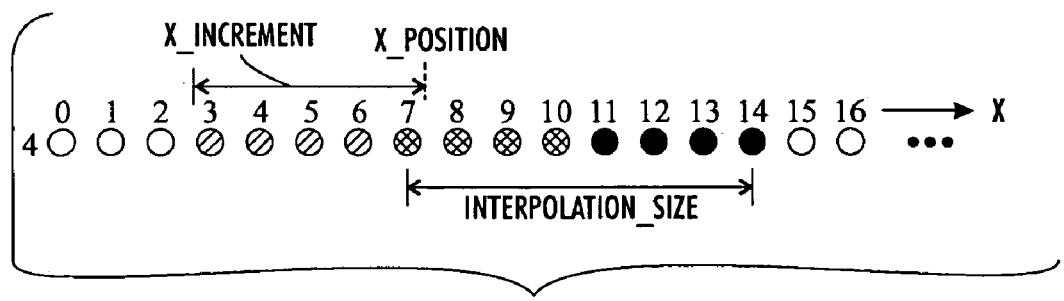
FIG. 7 shows exemplary pixels selected for generating a second pixel of the reduced size image.

FIG. 7 shows the current x_position being updated to a next current x_position by incrementing the current x_position value by the x_increment value. FIG. 7 shows that the x_increment value is slightly greater than 5 pixel positions resulting in the next current x_position value being slightly greater than the position of pixel 7. Thus, the x_pixel value is set to 7 and pixels 7-14 are selected by the position controller 114 to generate the next pixel of the reduced size image. As shown in FIG. 7, pixels 7-10 are used twice. Once when grouped together with pixels 3-10 and again when grouped together with pixels 7-14. Thus, pixels 7-10 are used to generate two pixels in the reduced size image. The x_increment value may be set so that there is no case where a pixel is used more than twice to generate the reduced size image.

Figure 8:
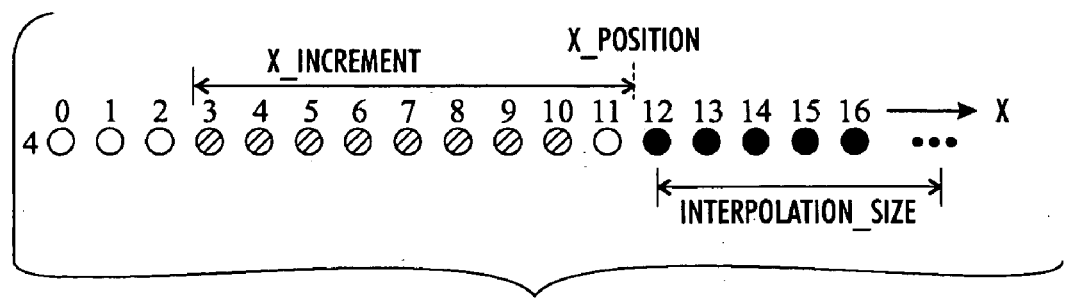
FIG. 8 shows exemplary pixel selection that discards pixels.

FIG. 8 shows an x_increment value so that x_position is nearest to pixel 12. In this case, pixel 11 is skipped over so that pixel 11 does not contribute to any of the pixel values in the reduced size image.

Figure 9:
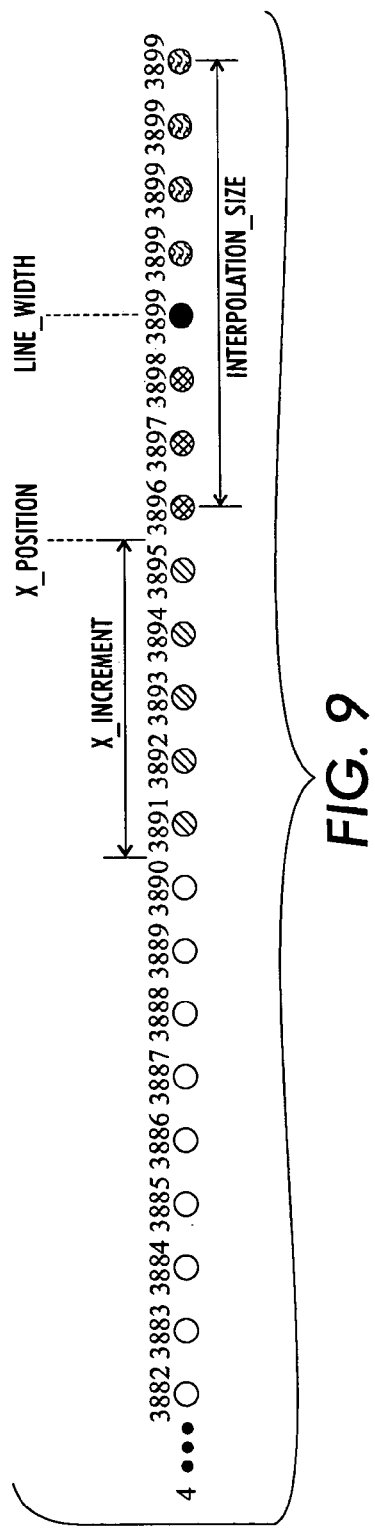
FIG. 9 shows pixel selection that requires replicating a last pixel of a line of the original image.

FIG. 9 shows a situation where x_position is near the line_width value. As shown, x_position is nearest to pixel 3896. However, when the position controller 114 attempts to retrieve a number of pixels of the original image specified by the interpolation_size parameter, which for this example has a value of 8, only pixels 3896-3899 are available in the original image. In this case, pixels 3896-3899 are selected and pixel 3899 is replicated until there are enough pixel values for the interpolator to generate the pixel of the reduced size image. Instead of replicating the last pixel, the position controller 114 or the interpolator 112 may simply repeatedly used the last pixel. If the line_width value is set so that a sufficient number of pixels in the original image beyond the line_width are available, then the replication process is not required and the position controller 114 may retrieve the pixels in the original image that is beyond the line_width value for the interpolation process.

Figure 10:
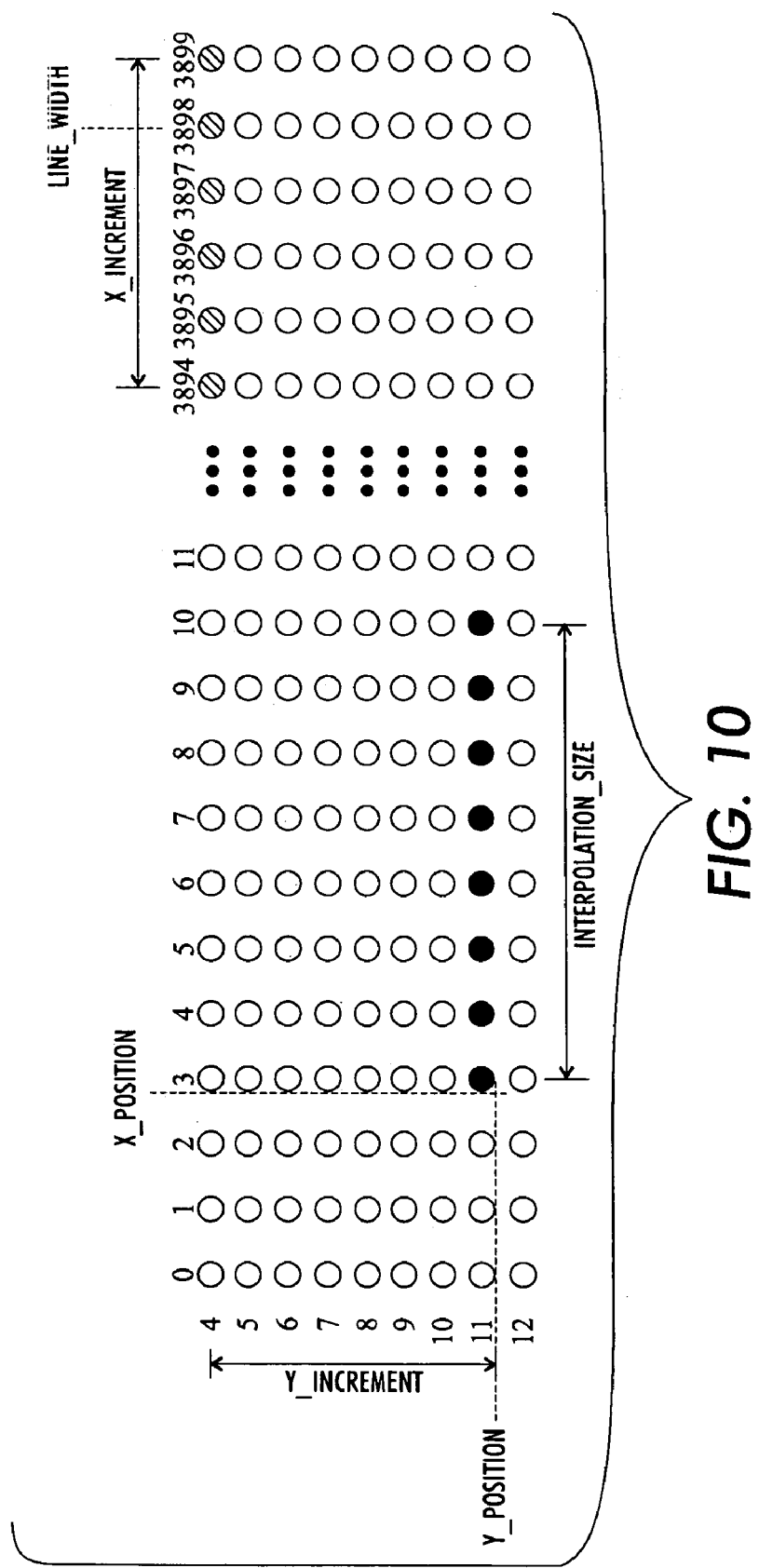
FIG. 10 shows an exemplary process for discarding information in the y-dimension of the pixel diagram of FIG. 5.

FIG. 10 shows a situation where x_position plus x_increment exceeds line_width. In this case, x_position is reset to x_start and y_position is incremented by y_increment. Y_pixel is selected to a line that has a closest position y-dimensional value to y_position. As shown, line 11 is selected and pixels 3-10 of row 11 are retrieved by the position controller 114 to generate the next pixel of the reduced size image. As mentioned above, when the y_position value is incremented, x_count is set to a predetermined value such as 0 and the y_count is incremented by 1, for example. Thus, for the example shown in FIG. 10, x_count is equal to 0 and y_count is equal to 1.

If after incrementing y_count by 1 and y_count exceeds a y_count_limit, then the a maximum number of lines in the reduced size image is exceeded. In this case, the reduced size image generation process is completed and the reduced size image is output to a following process. If pixels of the reduced size image was output as they are generated, then the reduced size image generation process ends or begins generating another reduced size image. The y_count_limit parameter may be optional. If not used, then the reduced size image generation process merely continues until the number of lines in the original image is exhausted.

The pixels for the reduced size image that are generated by the interpolator 112 may first be stored in the memory 108 and output through the input/output port 116 to a next stage of process after the complete reduced size image is generated. However, depending on the implementation, the pixels of the reduced size image may be output by the input/output port 116 to following processes as each of the pixels of the reduced size image is being generated by the interpolator 112.

While the above discussion described the functions performed by the various hardware components such as the position controller 114 and the interpolator 112, these function can be implemented in software executing in an appropriate processor such as the CPU 106 for example. In such an implementation, the software determines which data points (pixels) in the original image to use for interpolation to generate a corresponding pixel in the reduced size image. The control parameters such as x_start, y_start, x_position, y_position, x_increment, y_increment, x_size, y_size, line_width, x_count, y_count, x_count_limit, y_count_limit, etc. may be variables manipulated by the software to implement the reduced size image generation process. The process implemented by either hardware or software would be essentially the same and may be outlined by a flowchart as discussed below.

Figure 11:
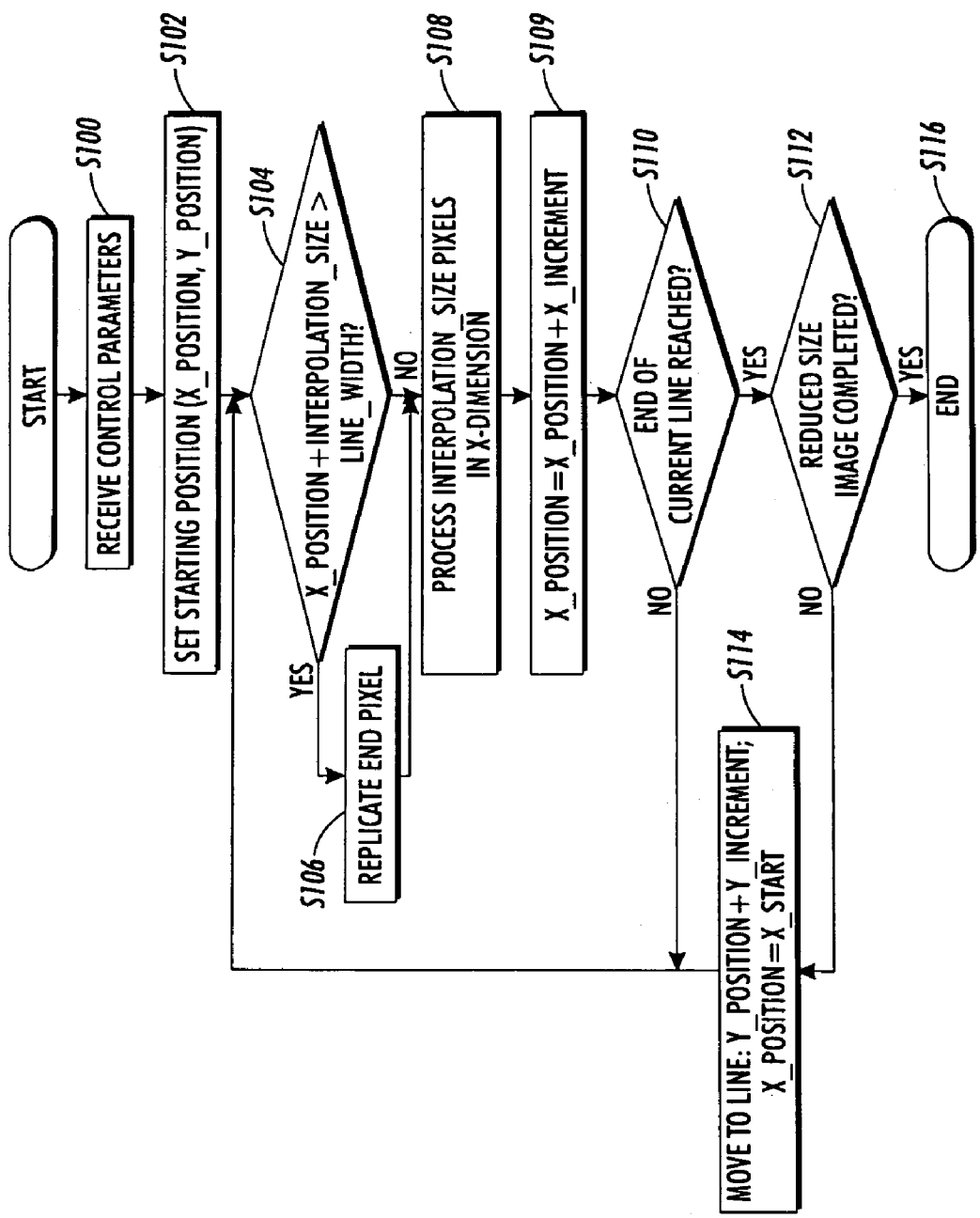
FIG. 11 shows a method for generating a reduced size image.

FIG. 11 shows a flowchart for a process for generating a reduced size image. In step S100, control parameters such as shown in FIG. 4 are received for controlling the reduced size image generation and the process goes to step S102. As noted above, these control parameters may be pre-stored and thus step S100 would be unnecessary. In step S102, a starting position relative to a predetermined reference point in an original document is obtained by setting a value of a current x_position and a value of a current y_position to values of x_start and y_start parameters, respectively. As discussed above, a pixel in the original image that is closest to a position identified by the current x_position and the current y_position is selected as a starting pixel. Parameters x_pixel and y_pixel are also set corresponding to a pixel number and a line number that are closest to the x_position and y_position. The x_pixel and y_pixel values are used to precisely identify pixels that are used to generate a specific pixel in the reduced size image. After step S102, the process goes to step S104.

In step S104, a test is made whether there is sufficient number of pixels in the original image of the current line to complete the interpolation process. If insufficient, the process goes to step S106; otherwise, the process goes to step S108. In step S106, the last pixel of the current line is replicated until there is sufficient number of pixels for the interpolation process, and the process continues to step S108. As mentioned above, the replication of pixels can be done on a line-by-line basis during the interpolation process rather than as a separate preparatory step S108. In situations where memory resources are scarce, it may be preferable to hang on to the last pixel on the current line rather than pre-calculate and store a number of replicated pixels for several output lines.

In step S108, the process selects a number of pixels in the original image along the current line (x-dimension) that is specified by the interpolation_size parameter and the interpolation process generates a pixel of the reduced size image. The interpolation process may multiply each of the selected pixels by a corresponding weight and summing the multiplication results and dividing the sum by a value corresponding to the interpolation_shift parameter. For increased speed, all the weights may be set equal to 1, the interpolation_size parameter may be set to a power of 2 and the interpolation_shift parameter may be equal to a number of bindery shifts to obtain an average value of the selected pixels. Then, the process goes to step S109. In step S109, the current x_position is incremented by x_increment to obtain a next current x_position and the process goes to step S110.

In step S110, a test is made whether the end of the current line has been reached by comparing the next current x_position with the value of the line$_{13}$ width parameter, or when the x_count of pixels exceeds x_count_limit, if provided, whichever occurs first. If the next current x_position is less than or equal to the value of the line_width parameter, the end of the current line is not reached, and the process returns to step S104; otherwise, the end of the current line is reached and the process goes to step S112. In step S112, a test is made whether all the pixels of the reduced size image have been generated. If all the pixels are generated, the process goes to step S116 and ends; otherwise, the process goes to step S114. The control parameters may include a total number of pixels of the reduced size image. If this parameter is provided, a count of the number of pixels generated may be maintained and when this count is equal to the total required number of pixels, the test in step S112 becomes successful and the process goes to step S116. In step S114, the x_position parameter is set to the value of x_start and the y_position parameter is incremented by the value of y_increment. Then, the process returns to step S104.

The above described method is performed for each of the color components of the original image in YCC color space. If the chromatic values have been subsampled by a factor of 2:1, for example, then the x_increment, y_increment, interpolation_size and line_width parameters should be correspondingly reduced to half their values, and the interpolation_average parameter should be reduced by one, if it corresponds to a number of right shifts, to normalize the interpolation sum.

While the invention has been described in conjunction with exemplary embodiments, these embodiments should be viewed as illustrative, not limiting. Various modifications, substitutes or the like are possible within the spirit and scope of the invention. In particular, for images spanned by more than two-dimensions such as three-dimensional images, x-y image planes in a portion of the z-dimension may be discarded thus selecting remaining x-y image planes for processing. X_size by y_size blocks within each of the selected x-y planes may be processed by averaging each of the selected blocks or various other two-dimensional interpolation processes may be used to generate a data point of the reduced size image.

Additionally, while the parameters x_, y_start; x_, y_position; x_, y_increment are discussed as having values corresponding to a predetermined reference point in the original document, these parameters may simply specify positions in terms of pixels where the top left pixel is the predetermined reference point. In this case, x_, y_start would be the number of pixels in the x_ and y_dimensions and x_, y_increment would be a pixel count in the x_ and y_dimension. The x_position and y_position would be identical to x_pixel and y_pixel.

What is claimed is:

1. A method for generating a thumbnail image, comprising:
   discarding data of a portion of lines of an original image of an original document;
   combining data not discarded to generate the thumbnail image corresponding to the original image;
   identifying the portion of lines to be discarded based on a y_position value and a y_increment value;
   selecting pixels in lines not discarded that are within a neighborhood from a current x_position value and an x_size value;
   combining values of selected pixels to generate a value of a current pixel of the thumbnail image;
   including one or more pixels in a first neighborhood that are within a boundary corresponding to the current x_position value and a position corresponding to a sum of the current x_position value and the x_size value;
   generating a next current x_position value for a next pixel of the thumbnail image by:
      adding the x_increment value to the current x_position value corresponding to the current pixel of the thumbnail image, or
      adding the y_increment value to a current y_position value corresponding to the current pixel of the thumbnail image and setting the next current x_position value to an x_start value if a sum of the x_increment value and the current x_position value exceeds a line_width value, or when an x_count value of reduced size pixels exceeds an x_count limit value, the x_count value being a pixel number in a current line of the reduced size image;
      including pixels in a next neighborhood that are within a next boundary corresponding to the next current x_position value for the next pixel of the thumbnail image and the next current x_position value corresponding to a sum of the current x_position value and the x_size value; and
   using repeatedly a last pixel when positions corresponding to the sum of a value of the current x_position value and the x_size value exceed a position of a last pixel in a current line of the original image.

2. The method of claim 1, further comprising:
   setting the boundary to include pixels of the original image that has a position that is at most half a distance between adjacent pixels from the current x_position value, and to include pixels of the original image that has a position that is less than half the distance between adjacent pixels from a position of the current x_position value plus an x_size value.

3. The method claim 1, further comprising:
   setting a number of selected pixels to be a power of two;
   summing into a sum the selected pixels; and
   binary shifting the sum by an exponent of the power of two to generate the current pixel of the thumbnail image.

4. A method for generating a reduced size image, comprising:
   discarding all data spanned by a portion of one or more first dimensions of a plurality of dimensions that span an original image of an original document;
   combining data not discarded to generate a reduced size image corresponding to the original image;
   identifying the portion of the first dimensions based on one or more first position values and one or more first increment values, one first position value and one first increment value corresponding to each of the first dimensions;
   identifying the data not discarded based on the first position values, the first increment values, second position values and second increment values, each pair of the second position and increment values corresponding to one of second dimensions which are the plurality of dimensions other than the first dimensions;
   selecting data points of the data not discarded that are within a neighborhood from a current position value corresponding to the first and second position values; and
   combining selected data points to generate a current data point of the reduced size image;
   including one or more data points in a first neighborhood that are within a boundary corresponding to the current position value and a position value corresponding to a sum of the current position values and corresponding size values, one size value corresponding to each of the second dimensions;
   generating next current position values for a next data point of the reduced size image by:
      adding the second increment values to the current position values corresponding to the current data point of the reduced size image in the second dimensions, or
      adding the first increment values to the current position values corresponding to the current data point of the reduced size image in the first dimensions and setting the next current position values in the second dimensions to start values corresponding to the second dimensions if a sum of the second increment values and the current position values exceeds width values corresponding to any of the second dimensions, or when a count value in one of the second dimensions of reduced size pixels exceeds a corresponding count_limit value, the count value being a next data point position in a current line of the reduced size image; and
      including data points in a next neighborhood that are within a next boundary corresponding to the next current position and a position value corresponding to a sum of the current position values and the corresponding size values; and
   replicating last data points in any of the second dimensions when respective position values corresponding to the sums of the current position values and the corresponding size values exceed position values of last data points in respective dimensions in the original image.

5. The method of claim 4, further comprising:
   setting the boundary to include data points of the original image that has a position value that is at most half a distance between adjacent data points from the current position value in any of the second dimensions, and to include data points of the original image that has a position value that is less than half the distance between adjacent data points from a position value set by any one of the current position values plus a corresponding size value in any of the second dimensions.

6. The method of claim 4, further comprising:

setting a number of selected data points to be a power of two;

summing into a sum the selected data points; and binary shifting the sum by an exponent of the power of two to generate the current data point of the reduced size image.

7. An apparatus, comprising:

an interpolator;

a position controller coupled to the interpolator;

one or more position values coupled to the position controller, the position controller discarding all data in an original image of an original document spanned by a portion of first dimensions of a plurality of dimensions that span the original document by processing the position values to skip over discarded data, and the interpolator combining data not discarded to generate a reduced size image of the original image;

first increment values;

second increment values;

the position values including first position values and second position values, wherein the position controller:

identifies the portion of the first dimensions based on the first position values and the first increment values;

identifies the data not discarded based on the first position values, the first increment values, the second position values and the second increment values, each pair of the first position and increment values corresponding to one of first dimensions, each pair of the second position and increment values corresponding to one of second dimensions which are the plurality of dimensions other than the first dimensions;

selects data points of the data not discarded that are within a neighborhood from a current position value corresponding to the first and second position values, and combines selected data points to generate a current data point of the reduced size image;

size values, one size value corresponding to each of the second dimensions, wherein the position controller:

includes one or more data points in a first neighborhood that are within a boundary corresponding to the current position value and a position value corresponding to a sum of the current position values and corresponding size values, generates next current position values for a next data point of the reduced size image by:

adding the second increment values to the current position values corresponding to the current data point of the reduced size image in the second dimensions, or adding the first increment values to the current position values corresponding to the current data point of the reduced size image in the first dimensions and setting the next current position values in the second dimensions to start values corresponding to the second dimensions if a sum of the second increment values and the current position values exceeds width values corresponding to any of the second dimensions, or when a count value in one of the second dimensions of reduced size pixels exceeds a corresponding count_limit value, the count value being a next data point position in a current line of the reduced size image; and including data points in a next neighborhood that are within a next boundary corresponding to the next current position and a position value corresponding to a sum of the current position values and the corresponding size values; and the position controller using repeatedly respective last data points in any of the second dimensions by keeping the current position value at the last data points when position values corresponding to the sums of the current position values and the corresponding size values exceed position values of the last data points in respective dimensions in the original image.

8. The apparatus of claim 7, the position controller setting the boundary to include data points of the original image that has a position value that is at most half a distance between adjacent data points from the current position value in any of the second dimensions, and to include data points of the original image that has a position value that is less than half the distance between adjacent data points from a position value set by any one of the current position values plus a corresponding size value in any of the second dimensions.

9. The apparatus of claim 7, the interpolator:

obtaining a power of two of selected data points;

summing into a sum the selected data points; and binary shifting the sum by an exponent of the power of two to generate the current data point of the reduced size image.

10. A xerographic marking device incorporating the apparatus of claim 7.

11. A marking device incorporating the apparatus of claim 7.

12. A digital photocopier incorporating the apparatus of claim 7.

* * * * *